INVENTORS
FRANK SLAMAR & ALFRED TEPLITZ
By Donald H. Dalton
Attorney

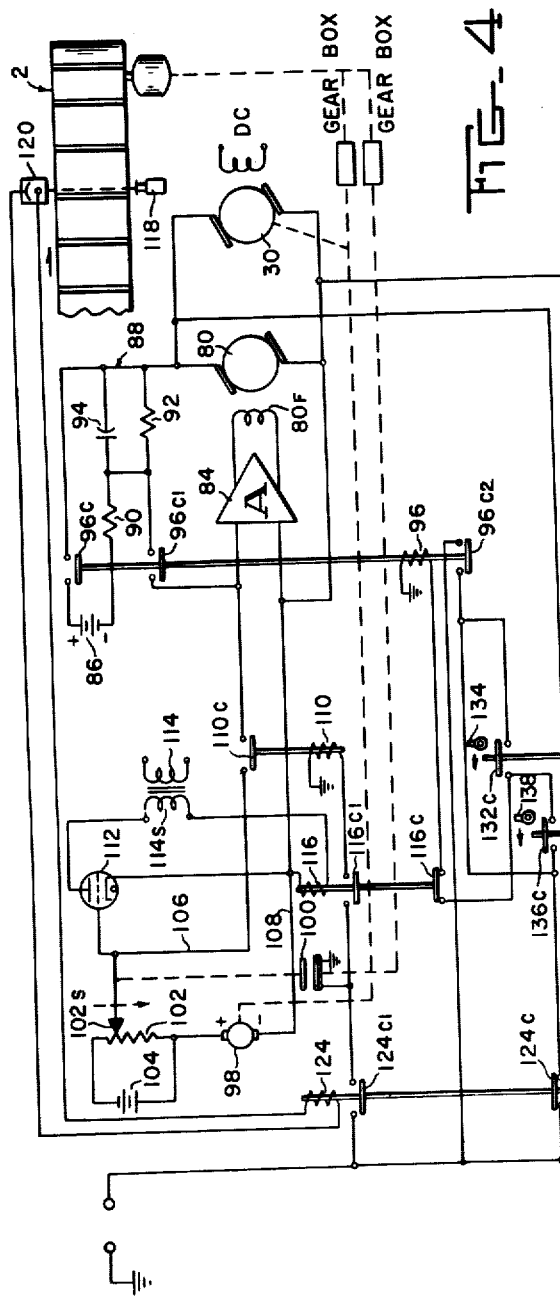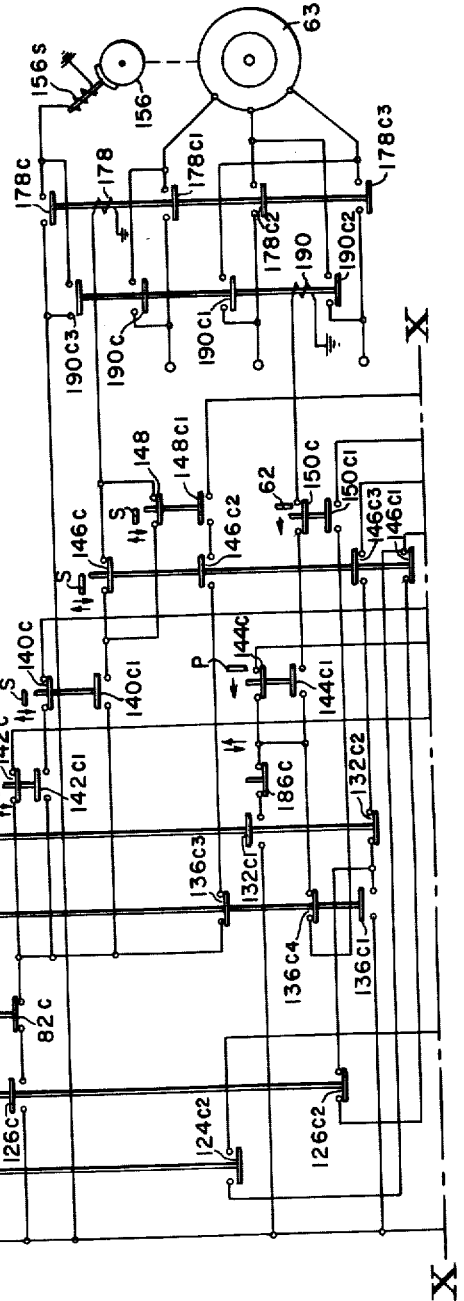
FIG. 4

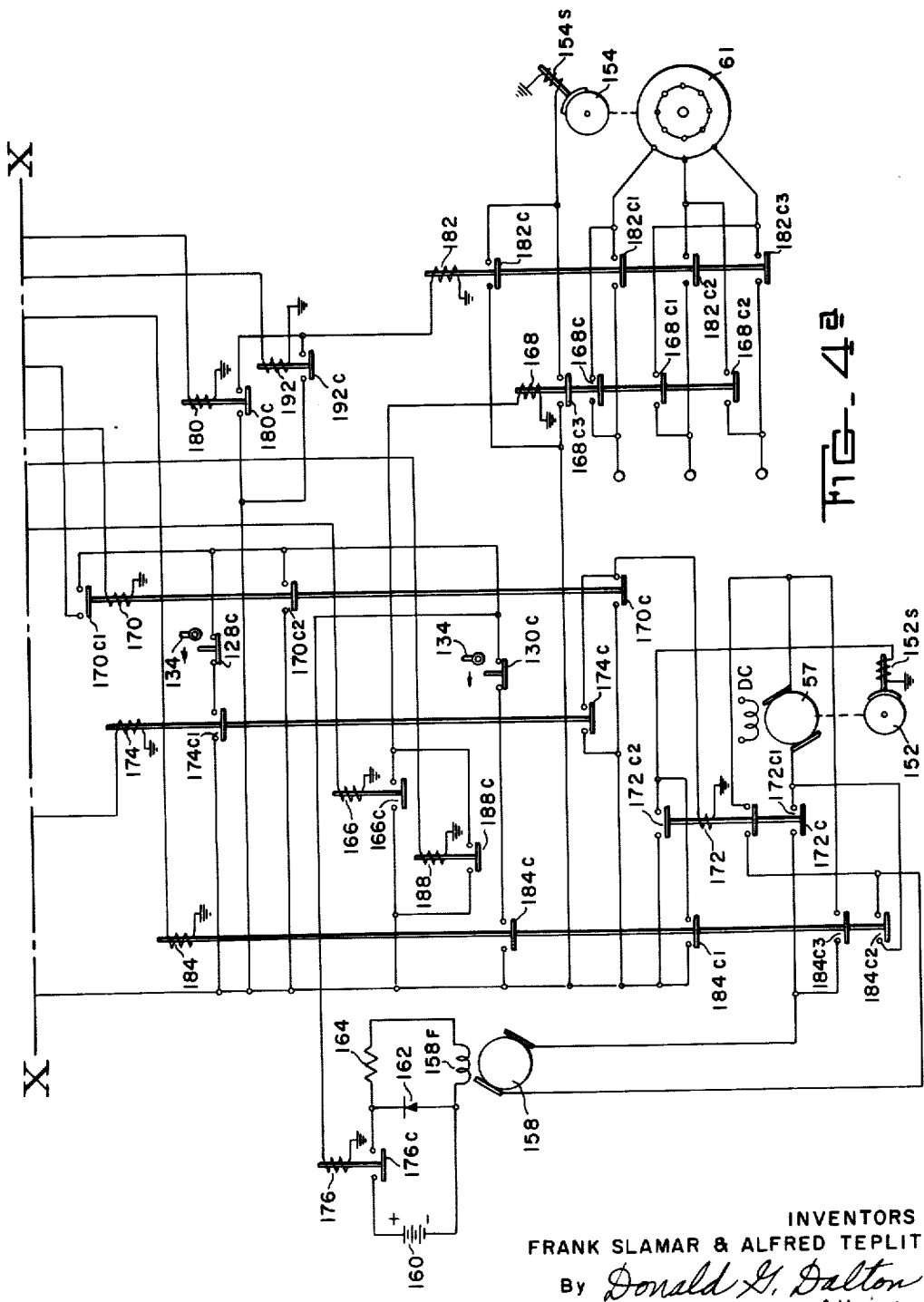

United States Patent Office 3,092,270
Patented June 4, 1963

3,092,270
TRANSFER MECHANISM
Frank Slamar, Monroeville, and Alfred Teplitz, Pittsburgh, Pa., assignors to United States Steel Corporation, a corporation of New Jersey
Original application Sept. 9, 1958, Ser. No. 760,005, now Patent No. 3,019,577, dated Feb. 6, 1962. Divided and this application Oct. 25, 1960, Ser. No. 64,820
2 Claims. (Cl. 214—89)

This application, which is a division of our co-pending application, Serial No. 760,005, filed September 9, 1958, now Patent No. 3,019,577, dated February 6, 1962, relates to a transfer mechanism, and more particularly to mechanism for transferring bundles of tin plate from the discharge end of one conveyor to the entry end of a second conveyor and positioning it in a desired position. The package or bundle of tin plate could be positioned manually on the second conveyor, but this has the disadvantage that the workman having that duty might be delayed so that operations would have to wait until a bundle is obtained and placed in position. Also, having a workman for this purpose in expensive.

It is therefore an object of our invention to provide apparatus for automatically transferring bundles of tin plate or the like from one conveyor and positioning it in a desired position on a second conveyor.

This and other objects will be more apparent after referring to the following specification and attached drawings, in which.

Figure 1:
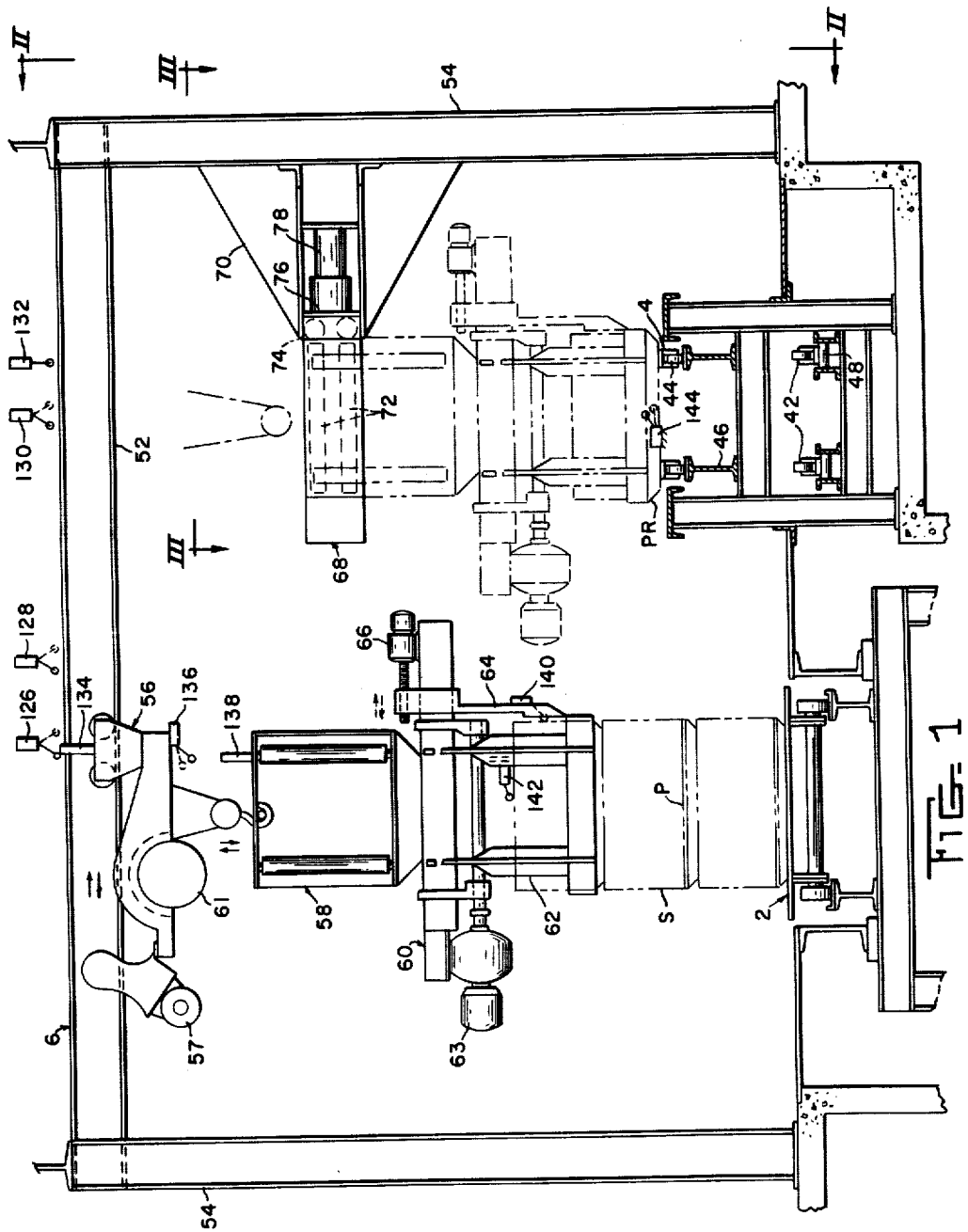
FIGURE 1 is a schematic elevation of the transfer mechanism of our invention.
Figure 2:
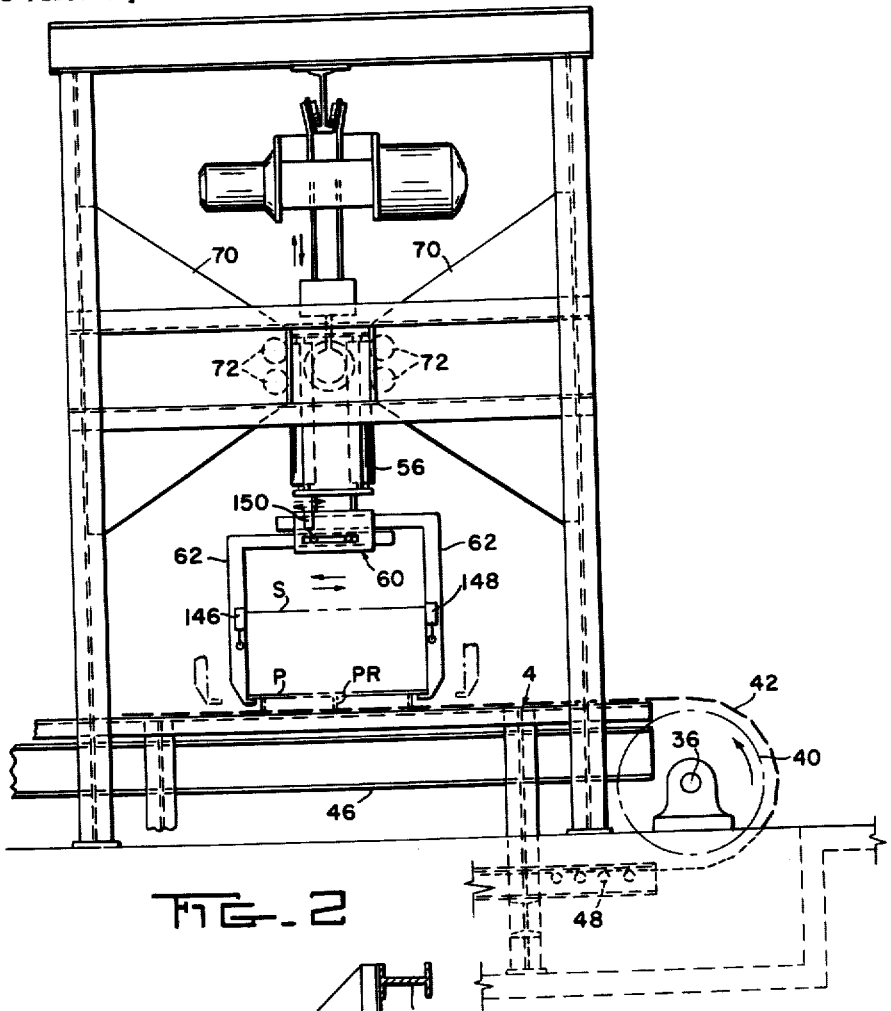
FIGURE 2 is a view taken on the line II—II of FIGURE 1.
Figure 3:
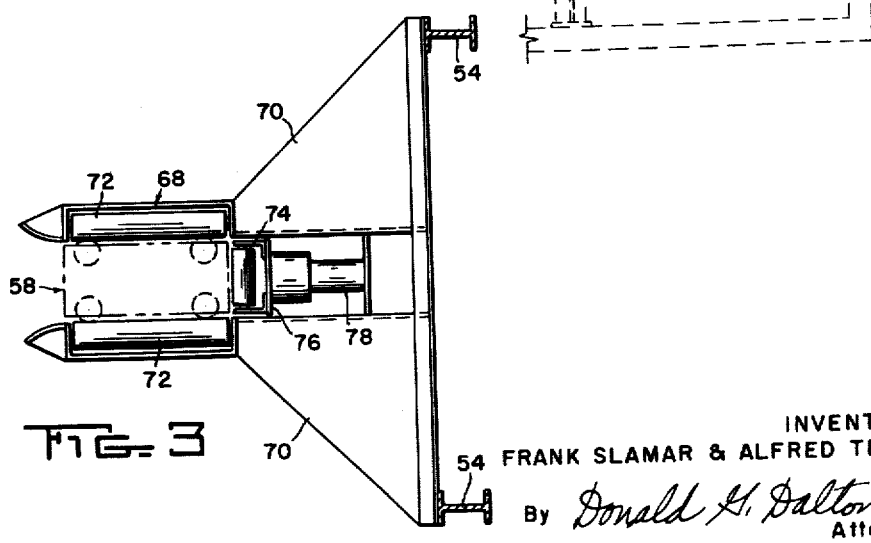
FIGURE 3 is a view taken on the line III—III of FIGURE 1.

FIGURES 4 and 4a, when connected on the lines X—X, disclose a schematic electrical diagram for controlling the operation of our device.

Referring more particularly to the drawings, reference numeral 2 indicates an entry conveyor. A packaging conveyor 4 is arranged parallel to conveyor 2 with its entry end alongside the exit end of conveyor 2. A monorail transfer 6 is arranged above the conveyors 2 and 4 adjacent the exit end of conveyor 2. The conveyor 2 is driven by a motor 30 through suitable gearing. Bundles of tin plate S mounted on a wooden platform P having spaced apart runners PR are wrapped or packaged on the conveyor 4. Conveyor 4 is of conventional design and includes a tail shaft 36 on which are mounted sprockets 40. In like manner sprockets and a head shaft, not shown, are provided at the other end of the conveyor. The sprockets 40 engage two parallel strands of large pitch roller chains 42. The chains 42 include rollers 44 which ride on upper tracks 46. The chains 42 ride on lower return rolls 48. A suitable take-up device, not shown, is preferably provided.

The monorail or entry bundle transfer 6 of our invention includes a beam or rail 52 supported by columns 54, a trolley and hoist 56 mounted on the beam 52 and traversed by means of motor 57, an assembly of vertical rollers 58 carried by hoist 56, and a sheet lifter 60 carried by the roller assembly 58. The lifter 60 is raised and lowered by a motor 61 and may be of any standard form. It includes two parallel moving lifting angles or jaws 62 which engage a wood platform P on which sheets S are piled. The angles 62 are movable toward and away from each other in any desired manner by means of a motor 63. The lifter 60 also has an adjustable centering arm 64 at the end thereof adjacent conveyor 4. The arm 64 may be adjusted longitudinally by a motor operated screw and nut arrangement 66. A squaring stop 68 is mounted on columns 54 adjacent conveyor 4. The stop 68 includes spaced brackets 70 each carrying horizontally disposed rollers 72 providing a guide for receiving and centering the roller assembly 58. The stop proper includes horizontally disposed rollers 74 arranged at the end of rollers 72 and mounted on a spring backed plate 76. An hydraulic shock absorber 78 carries the spring backed plate 76. Several stations are arranged along packaging conveyor 4, Station No. 1 being directly beneath squaring stop 68.

Power to conveyor motor 30 is supplied from a generator 80 having a field winding 80F. A relay coil 82 having a normally closed contact 82C is connected the output leads of generator 80. Voltage is supplied to field 80F of generator 80 through an amplifier 84. Reference voltage is applied to generator 80 and amplifier 84 from D.C. power source 86 through network 88 consisting of resistors 90 and 92, capacitor 94 and normally open contact 96C operable by relay coil 96. Relay coil 96 also has a normally open contact 96C1 located in the circuit to amplifier 84 and a normally open contact 96C2. When relay coil 96 is energized closing its contacts, generator 80 and amplifier 84 form a closed-loop voltage regulating system with network 88 providing a delay in the application of voltage from source 86 so that the generator voltage will build up gradually and give a controlled acceleration to motor 30. Motor 30 is also mechanically connected to a tachometer generator 98 and through a magnetic clutch 100 to slider 102S of rheostat 102 which has a square root characteristic. Power source 104 is connected across the terminals of rheostat 102. Generator 98 is connected to amplifier 84 by leads 106 and 108. Normally open contact 110C operable by relay coil 110 is provided in lead 106. A circuit including Thyratron tube 112, secondary 114S of transformer 114, and relay coil 116 is connected across leads 106 and 108. Relay coil 116 operates a normally closed contact 116C and a normally open contact 116C1. A light source 118 and a photoelectric cell 120 are located adjacent the exit end of conveyor 2 at an elevation where the smallest bundle of sheets S on the conveyor will interrupt the light beam. Suitable means (not shown) are provided to adjust the position of light beam 118 and photoelectric cell 120 longitudinally of conveyor 2. A relay coil 124 is connected to photocell 120 and is energized when the light beam is interrupted. Relay coil 124 operates normally closed contact 124C and normally open contacts 124C1 and 124C2. Supported from beam 52 in the path of movement of trolley 56 are switches 126, 128, 130 and 132. Switch 126 has normally open contact 126C and normally closed contact 126C2 and is operable by cam 134 mounted on trolley 56. Switch 128 will open when contacted by cam 134 moving to the left as seen in FIGURE 1 and close when contacted by cam 134 moving to the right. Switch 130 operates the reverse of switch 128. Switch 132 has normally open contacts 132C and 132C1 and normally closed contacts 132C2. A top limit switch 136 is mounted on trolley 56 and is operated by a cam 138 mounted on roller assembly 58. Switch 136 has normally open contacts 136C and 136C1 and normally closed contacts 136C3 and 136C4. A switch 140 having normally closed contact 140C and normally open contact 140C1 is mounted on the arm 64. A switch 142 having normally closed contact 142C and normally open contact 142C1 is mounted on the lifter 60 and may be adjusted vertically to suit the size bundle being handled. A switch 144 is mounted on the frame of conveyor 4 and has normally closed contact 144C and normally open contact 144C1. Switch 146 is mounted on one of the jaws 62 and has two normally closed contacts 146C and 146C1 and two normally open contacts 146C2 and 146C3. A switch 148 is mounted on the other jaw 62 and has a normally closed contact 148C and a normally open contact 148C1. A switch 150 is adjustably mounted on lifter 60 and has a normally closed contact 150C and a normally open contact 150C1. Brakes 152, 154 and 156 are associated with motors 57, 61 and 63, respectively, and are of the type that are in released position when their solenoids are energized and are applied by spring pressure when their solenoids are deenergized. Motor 57 is energized from a generator 158 having a field winding 158F. The circuit for field 158F includes a D.C. power source 160, rectifier 162 and resistor 164.

The operation of our device is as follows: The operator places bundles of sheets S on the entry conveyor 2 with the platform P so arranged that the runners PR run transversely of the conveyor. If bundles are piled one on top of the other they must be arranged so that the one on top is positioned with its sides in general alignment with the one below. The light 118 and photocell 120 are adjusted to their correct position for the particular size bundle being handled and any other necessary adjustments are made. No further adjustment is necessary until bundles of a different size are to be packaged. When there is no bundle in the take-off position at the end of the conveyor 2 the photocell 120 will be illuminated and the relay coil 124 will be deenergized and its contact 124C will be closed. If the switch contact 136C is closed or the trolley 56 is over the packaging conveyor 4 so that switch contact 132C is closed, a circuit will be completed through relay coil 96. This closes contacts 96C and 96C1, thus energizing motor 30 and causing conveyor 2 to advance until a bundle interrupts the light beam to photocell 120 which energizes relay coil 124. This causes clutch 100 to engage, thus moving slider 102S downwardly as seen in FIGURE 4. When the voltage across wires 106 and 108 is approximately zero, tube 112 will fire and energize coil 116, thus opening contact 116C and closing contact 116C1. Opening of contact 116C deenergizes coil 96 to open contacts 96C, 96C1 and 96C2 and closing of contact 116C1 energizes coil 110 to close contact 110C, changing the regulating system to a position which slows down motor 30 at a constant rate and causes the bundle to be accurately positioned at standstill. When the last bundle is removed from the end of the conveyor and the light beam is exposed, the clutch 100 is deenergized and a spring (not shown) returns slider 102S to its original position. When the conveyor 2 stops with a bundle or bundles in correct position relay coil 82 will be deenergized and its contact 82C will close so that when the trolley 56 is at its back limit with the switch contact 126C closed, relay coil 166 will be energized, thus closing its contact 166C. This in turn energizes relay coil 168, closing its contacts 168C, 168C1, 168C2 and 168C3 to complete a circuit to lifter motor 61 and to brake solenoid 154S to release brake 154. The lifter will lower until switch 142 hits the top of the highest bundle at the end of conveyor 2, thus opening contact 142C and closing contact 142C1. Opening of contact 142C deenergizes motor 61 and sets brake 154. Closing of contact 142C1 energizes relay coil 170, thus closing its contacts 170C which in turn energizes relay coil 172. This closes contacts 172C and 172C1 in the directional circuit of trolley motor 57 and also its contact 172C2, thus energizing solenoid 152S to release brake 152. Energization of coil 170 also closes its contacts 170C1 and 170C2, which completes circuits through relay coils 174 and 176. Energization of relay coil 174 closes its contact 174C which completes a parallel circuit to relay coil 172 which is already energized and also closes its contact 174C1. Energization of coil 176 closes its contact 176C, thus energizing motor 57 from generator 158 to move trolley 56 until switch 140 is actuated opening its contact 140C and closing its contacts 140C1. At this time the lifter 60 is centered over the bundle. Closing of contact 140C1 energizes relay coil 178 which closes its contact 178C to complete a circuit through solenoid 156S to release brake 156. Contacts 178C1, 178C2 and 178C3 are also closed completing a circuit to motor 63 causing the jaws 62 to close until switches 146 and 148 are actuated. Actuation of switch 146 opens its contacts 146C and 146C1 and closes its contacts 146C2 and 146C3. Actuation of switch 148 opens its contact 148C and closes its contact 148C1. Closing of contacts 146C2 and 148C1 completes a circuit through relay coil 180 closing its contact 180C which energizes relay coil 182 closing its contact 182C to close a parallel circuit to solenoid 154S and also closing its contacts 182C1, 182C2 and 182C3 in the circuit of lifter motor 61. This raises the lifter 60 until switch 136 is actuated, thus closing its contact 136C1 to complete a circuit to relay coil 184 which in turn closes its contacts 184C, 184C1, 184C2 and 184C3. Closing of contact 184C completes a circuit to relay coil 176 which in turn closes its contact 176C to apply voltage to generator field 158F. Due to the time delay of the generator field the voltage build-up is gradual, giving smooth acceleration to prevent swaying of the trolley 56 as it moves the bundle toward conveyor 4. When the trolley cam 134 actuates switch 130 to open its contact 130C the circuit to field 158F opens and the field is discharged through rectifier 162 to give a smooth deceleration until switch 132 is actuated to close its contacts 132C and 132C1 and open its contact 132C2. Opening of contact 132C2 deenergizes relay coil 184 and the brake 152 is applied stopping the trolley 56. When the conveyor 4 stops it closes contacts 186C. If the conveyor 4 is stopped at this time, relay coil 188 will be energized, thus closing its contacts 188C to complete a circuit to relay coil 168 which energizes motor 61 and releases brake 154 to lower the bundle onto conveyor 4. When the bundle is on conveyor 4 switch 144 is actuated to open its contact 144C to stop movement of the lifter 60 and close its contacts 144C1 to complete a circuit to relay 190 closing its contacts 190C, 190C1, 190C2 and 190C3. Closing of the contacts energizes motor 63 and releases brake 156 so as to open the jaws 62. Opening of jaws 62 actuates switch 150 to open its contact 150C and close its contact 150C1. Opening of contact 150C deenergizes motor 63 and applies brake 156. Closing of contact 150C1 energizes relay coil 192 which closes its contact 192C to energize relay coil 182, thus energizing motor 61 and raising the lifter 60 until switch 136 is actuated. This completes a circuit to relay coil 174 through closed contacts 136C1, 126C2, 146C1 and 124C1 provided there is a bundle in the take-off position on conveyor 2. When coil 174 is energized trolley motor 57 will be energized to move trolley 56 back toward the entry conveyor 2 until the trolley 56 actuates switch 128 to open its contact 128C, thus deenergizing relays 174 and 176 which opens the field circuit of motor 57 and causes deceleration of the trolley 56. When switch 126 is actuated by trolley 56 the trolley will stop and the cycle will be repeated.

While one embodiment of our invention has been shown and described it will be apparent that other adaptations and modifications may be made without departing from the scope of the following claims.

We claim:

1. Apparatus for handling bundles comprising a first conveyor, a second conveyor having its entry end adjacent the exit end of the first conveyor, a rail located above the conveyors and extending from the exit end of the first conveyor to the entry end of the second conveyor, a hoist mounted for movement on said rail, a roller assembly carried by said hoist with the axes of the rollers generally vertical, a lifter beneath and carried by said roller assembly, said lifter including a pair of movable jaws for engaging opposite sides of said bundle, means for moving said jaws toward and away from each other, an adjustable centering arm between said jaws and means for moving said centering arm transversely of the path of movement of said jaws, means for raising and lowering said lifter, and a squaring stop located above the entry end of said second conveyor and adapted to receive said roller assembly.

2. Apparatus for handling bundles to claim 1 including automatic means for causing said lifter to lower and pick up a bundle from the exit end of said first conveyor and move said bundle to a position above the entry end of said second conveyor, and automatic means for lowering said bundle onto the entry end of said second conveyor when no bundle is on said second conveyor below said rail and said second conveyor is stopped.

References Cited in the file of this patent

UNITED STATES PATENTS

| | | |
|---|---|---|
| 715,746 | Boax | Dec. 16, 1902 |
| 2,254,285 | Harris | Sept. 2, 1941 |
| 2,885,063 | Austin | May 5, 1959 |
| 2,956,514 | Bishop | Oct. 18, 1960 |

UNITED STATES PATENT OFFICE
CERTIFICATE OF CORRECTION

June 4, 1963

Patent No. 3,092,270

Frank Slamar et al.

It is hereby certified that error appears in the above numbered patent requiring correction and that the said Letters Patent should read as corrected below.

Column 1, line 23, for "in" read -- is --; column 2, line 13, after "connected" insert -- across --; column 4, line 22, for "at" read -- as --; line 38, for "141Cl" read -- 144Cl --.

Signed and sealed this 10th day of December 1963.

(SEAL)
Attest:
ERNEST W. SWIDER

Attesting Officer

EDWIN L. REYNOLDS

Acting Commissioner of Patents